Dec. 4, 1951  S. P. LOWE  2,577,534
BRAKE SHOE TREATING APPARATUS
Filed Jan. 27, 1947
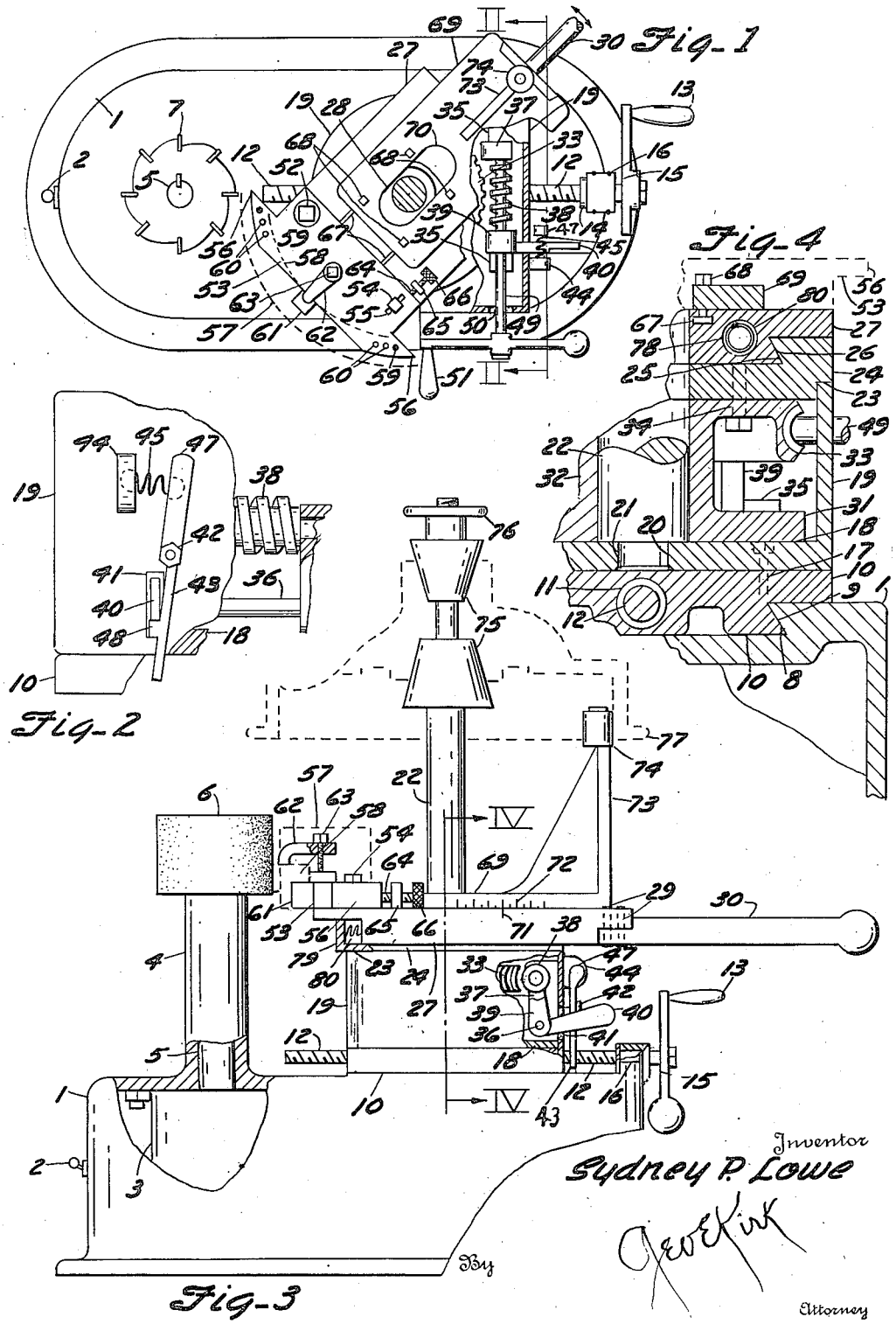
Inventor
Sydney P. Lowe Patented Dec. 4, 1951

2,577,534

UNITED STATES PATENT OFFICE 2,577,534

BRAKE SHOE TREATING APPARATUS

Sydney P. Lowe, Columbus, Ohio

Application January 27, 1947, Serial No. 724,632

1 Claim. (Cl. 90—20)

This invention relates to special dimension dressing or configuring of arc surfaces.

This invention has utility when incorporated in apparatus for acting upon the working face side of brake shoes. The cutting or dressing operation may be upon the face proper for removing irregularities, for truing, as well as upon the lining and the final finishing or burnishing thereof.

Referring to the drawings:

Fig. 1 is a plan view, with parts broken away, of an embodiment of the invention adapted for readily handling a wide range of sizes or dimensions of brake shoes, as for motor vehicles, the working tool herein being a rotary cutter;

Fig. 2 is a partial view from the line II—II, Fig. 1, on a larger scale, and in engaged instead of release position, for the worm gear transmission control means;

Fig. 3 is a side elevation, with some portions in section, of the apparatus of Fig. 1, however, here equipped with an abrader tool, and the turret at mid position, instead of askew as in Fig. 1; and Fig. 4 is a vertical section thru a portion of the turret mounting on the line IV—IV, Fig. 3.

The rotary tool

A machine base 1 has a switch 2 which is adapted to be thrown to closed position to operate a motor 3 in the base 1 (Fig. 3). Rising from the base 1, in alignment with the axis of the motor 3 is a column or sleeve 4 for a motor shaft 5 to connect directly to the motor and on a vertical axis, a work treating member, as a burnisher 6, or in substitution therefor, a cutter 7.

The turret mounting

Extending radially away from the column 4, the top of the base 1 has a dovetail guide or way 8 (Fig. 4). A complementary dovetail 9 provides a directing way for a slide 10. Centrally thru the slide 10 and in a radial direction toward the column 4 is an internally threaded way or long nutlike portion 11 for a screw stem 12. Remote from the column 4 and beyond the opposite end of the base 1, is a crank or handle 13 fixed with the stem 12. Turning of this crank 13 clockwise causes the slide 10 to be moved away from the column 4, while counterclockwise turning of the crank 13 causes the slide 10 to be moved toward the column 4, along the course of the cooperating dovetail means 8, 9. Terminally flanges 14, 15, fixed with the stem or shaft 12 are on opposite sides of a bearing 16 on the base 1, and cooperate to hold the stem 12 from longitudinal movement in its rotation.

Screws 17 (Fig. 4) assemble a frame plate 18 on the top of the slide 10. Rising from the outer portion of the plate 18, is a housing portion or flange 19. Centrally of the plate 18 and over the way 11 is an opening 20 into which a reduced end portion 21 of a vertical shaft or turret axis member 22 may be riveted. The shaft 22 is normally non-rotary as to its mounting on the base and is parallel to the column 4. The rotation of the crank 13 serves to adjust or change the distance between the turret axis member 22 and the axis of the rotary tool 6 or 7.

The turret oscillator

Concentric with the shaft 22, the flange 19 has a top bearing 23 for a cover plate 24. Parallel to a diameter for the shaft 22, the plate 24 has a dovetail track or way 25 with which may cooperate complementary dovetail way 26 of a secondary slide 27 having a slot clearance 28 (Fig. 1) to permit shifting of this slide 27 relatively to the turret axis 22. Bolts 29 (Fig. 3) mount an extension arm or handle 30 fixed with the slide 27. This provides a manual means for direct oscillation for the turret.

Supplementally a slower speed steady positive hold-in for swing control is provided. Between the plates 18, 24, in the housing 19 is a worm gear transmission. A bearing flange 31 (Fig. 4) on the plate 18, has a sleeve riser 32 therefrom about the shaft 22 and loose thereon. From the upper portion of the sleeve 32 there is a worm gear 33 connected by bolts 34 with the plate 24. The bearing 18, 31, may really carry the turret load, instead of on the bearing 23 at the plate 24.

In the housing 19 near the plate 18, bearings 35 position a rock shaft 36 which has a riser arm 37 connected to a worm 38, and an angle lever arm 39 also connected to the worm 38. A second arm 40 connected to the angle lever 39, extends thru a window or slot 41 in the housing 19. At a pivot bearing 42 on the housing 19 adjacent the window 41 is a lever or trigger 43. A lug 44 extending upward from the bearing 42 (Fig. 2) directs a compression helical spring 45 against upper arm 47 of the trigger to swing the trigger 43 which has a lower portion on which an offset or lug 48 serves as a catch under the arm 40 to hold the worm 38 in mesh relation with the worm wheel or gear 33. From the worm 38 is a shaft 49 through a slot 50 in the housing 19 to a crank 51. By shifting the trigger 43 and depressing the handle 40, the trigger as released will have the lug 48 ride on the handle 40 and hold the worm 38 out of mesh with the gear 33.

The work support

Adapted to engage the plate or slide 27 is a main bolt 52 (Fig. 1) for a brake shoe support 53. Remote from the bolt 52, a second bolt 54 engages in a slot 55 to lock the support 53 with the slide 27. The support 27 has arc end ears 56 upon which may rest end portions of a brake shoe 57 for its medial inward flange 58 to rest on pins 59 which may be adapted to the work 57 by placing in proper holes 60 therefor. A central projection 61 supports the shoe 57 medial portion and a clamp finger 62 may be locked by a bolt 63.

The slot 55 is a provision for adjusting the free or normally thrown end of a brake shoe as to the relatively fixed mounting of the location at the bolt 52. Against the support 53 near the bolt 54 is a screw 64 rotatable in a lug 65 rising from the slide 27. The screw 64 has a knurled head 66 for manual setting of the screw 64 to thrust the support 54 outward into a desired region for proper action of the rotary tool 6 or 7, upon the work 57. When so adjusted by the screw 64, the bolt 54 may be tightened, thus to lock the work support with the turret.

The turret working radius control

While the operation of the crank 13 provides positive means for changing the axis of the turret in its spacing from the rotary tool, such setting is in approximation of the range for the particular work undertaken, as well as direct throwing in and out. However, for nicety in control during the brake face treating, automatic control means is provided herein.

The upper side of the plate or slide 27 has bolt-holding slots 67 in the direction of the dovetail way 25, 26, for bolts 68 to lock a control plate 69 having a clearance slot 70 of greater extent than the slot 28 of the plate 27 as to the shaft 22.

It is in order to follow the general range setting as effected by the stem 12, in causing the plate 69 to be adjusted on the slide 27 to have index 71 (Fig. 3) tally with an appropriate graduation 72 for the work diameter adopted. The bolts 68 are then tightened. The slide 27 and the control plate 69 are now assembled to operate as a unit.

Rising from the plate 69 is a bracket 73 carrying at its top a roller 74 as a control feeler. The shaft 22 in its upward extent from the turret, has a pair of brakedrum hub fitting cones 75 adapted to be adjusted by a nut 76 to mount a brake drum 77 as a master pattern on the shaft 22. The drum 77 is coaxial with the turret. For the item of work to be undertaken, the feeler roller 74 is disposed to ride on the drum brake surface or interior.

Flexibility to permit the feeler 74 to respond to special conditions of departure are provided. The slide 27 is not fixed or rigid with the cover or plate 24. Parallel to the dovetail way 25, 26, and the slots 67, is a recess 78 (Fig. 4) at each side of the clearance 28. These recesses 78 are open ended to abut seat regions 79 (Fig. 3) of the plate 24. There is thus provided a yieldable coupling between the swingable plate 24 of fixed axis for the turret and the feeler controlled plate 69, for in each of the recesses 78 is a compression helical spring 80. The preferred practice is to locate a piece of work 57 to approximate the desired contact relation with the rotary tool 6, or 7. The rough or preliminary adjustment is effected by turning the crank 13, when the graduation marking 72 therefor is at the index 71.

The drum to be fitted by the particular brake shoe, or the master pattern 77, is engaged by the roller 74. The automatic response to the variations of the drum 77, whether over or under the original dimension, or special over or under, is automatically accounted for herein by the operator now operating the handle or crank 13 to locate the slot 28 with clearance each way from the axis 22.

The operation

Before starting the motor 3, the operator places an item of work 57 upon an appropriate dimension or size brake shoe support 53. In current motor vehicle internal drum brake friction face practice, the drum working face or inside diameter may run from six to twenty-four inches. A purpose herein is to reduce the special parts or fittings required for handling a wide range of sizes in the work. By noting the diameter for the face toward which the work 57 is to be thrown outwardly, the crank 13 may be operated to have the axis 22 approximate such radius as proper therefor. With the brake shoe 57 contacting the idle tool 6, and with the plates 27, 69, set for the clearance 28 to be snug against the axis shaft 22 on the side toward the tool and the clearance 70 snug against the shaft 22 opposite side, the action of the springs 80 is nullified, and there may be swinging operation by the handle 30 movement to and fro. This swinging operation is in the slow steady driving to and fro by turning the crank 51 for an oscillation arc one way and reversing for return; or there may be crank drive for cutting operation in one direction, and the release or throw out for the worm 38 and the handle 30 used for the return, and then to continue the same direction of worm gear transmission as the worm be thrown back into mesh with the worm gear 33. The free swinging operation both ways by the handle 30 is with the worm 38 locked out of mesh by the trigger 43.

For automatic accuracy of operation, a master or the drum 77 to have shoe fitted thereto, is mounted on the turret axis shaft 22. The feeler roller 74 is set to ride on the drum face. The crank 13 is set to adjust the clearance 28 clear of the shaft 22. As the roller 74 rides into larger internal diameter region of the drum 77, the work 57 is drawn away from the tool 6, or 7, so that less stock be removed therefrom, thereby automatically compensating for the feeler control. When there be less internal diameter for the drum, more stock is taken from the brake shoe face.

What is claimed and it is desired to secure by Letters Patent is:

A machine for finishing segmental brake shoes having brake lining material on the peripheral surface thereof, comprising in combination, a rotating cutter; a base having a horizontally extending guideway extending toward the cutter; a horizontally movable slide member mounted on the base and guided by the guideway, said base and slide member having nut and screw elements for moving the slide member along the base; a vertically extending post carried by the slide member; a turret head including a base mounted on said slide member, said turret head base having an opening receiving the post, said turret head base having a horizontally extending guideway, said turret head including a horizontally movable slide member mounted on the turret head guideway, and having an elongated opening receiving the post, said post being adapted to carry an arcuate guide member, the axis of the latter being coincident with the axis of the post; a brake shoe support carried by the second mentioned slide member for supporting a brake shoe with the brake lining thereon in cuttable relation with the cutter; a feeler carried by the second mentioned slide member in position to ride on the inner periphery of the arcuate guide member; a spring interposed between the turret head base and the second mentioned slide member yieldingly urging the feeler into engagement with the arcuate guide member; and means for oscillating the turret head base and second mentioned slide member about said post.

SYDNEY P. LOWE.

REFERENCES CITED

The following references are of record in the file of this patent:

UNITED STATES PATENTS

| Number | Name | Date |
| --- | --- | --- |
| 1,362,816 | Olson | Dec. 21, 1920 |
| 1,991,231 | Shiffman | Feb. 12, 1935 |
| 2,194,936 | Hatch | Mar. 26, 1940 |
| 2,304,530 | Bigelow | Dec. 8, 1942 |
| 2,325,826 | Barrett | Aug. 3, 1943 |
| 2,345,161 | Thomason | Mar. 28, 1944 |
| 2,365,078 | Hoier | Dec. 12, 1944 |
| 2,366,993 | Antos | Jan. 9, 1945 |